March 24, 1931. J. J. GIFFEL 1,797,229
TRUNK BED
Filed Feb. 10, 1930  3 Sheets-Sheet 1
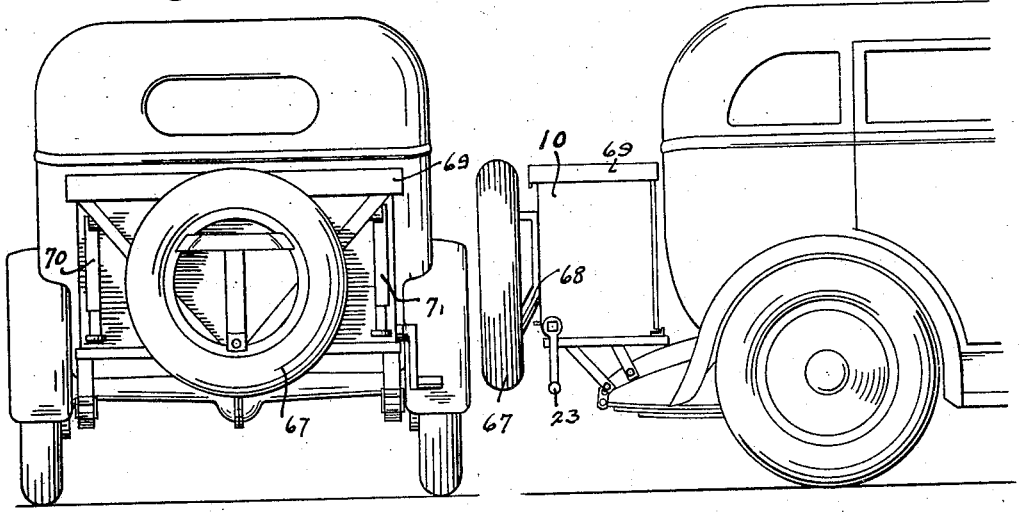
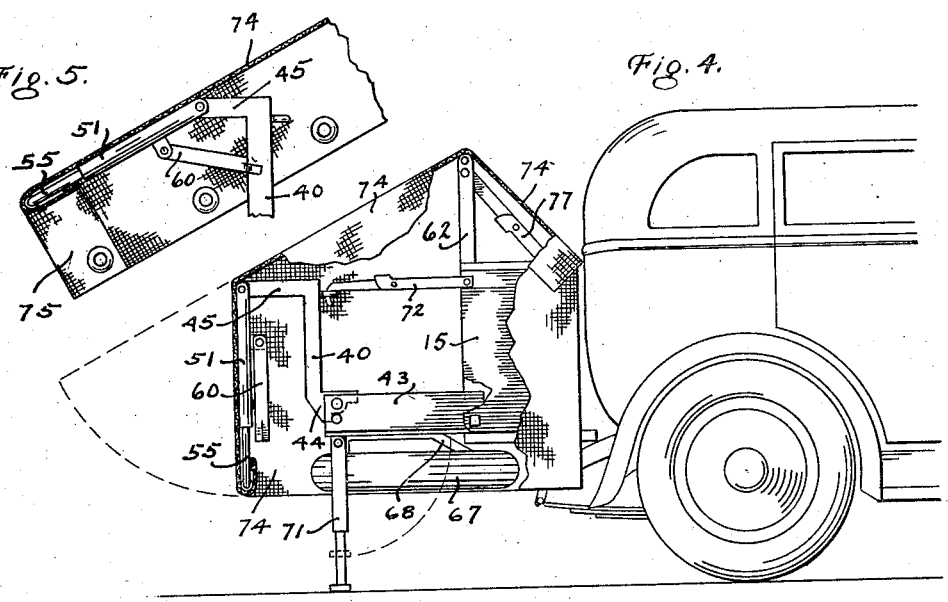
INVENTOR,
John J. Giffel,
By
Minturn & Minturn,
Attorneys.

March 24, 1931.  J. J. GIFFEL  1,797,229
TRUNK BED
Filed Feb. 10, 1930  3 Sheets-Sheet 2

INVENTOR
John J. Giffel,
By Minturn & Minturn,
Attorneys.

March 24, 1931.  J. J. GIFFEL  1,797,229
TRUNK BED
Filed Feb. 10, 1930    3 Sheets-Sheet 3
Fig. 7.
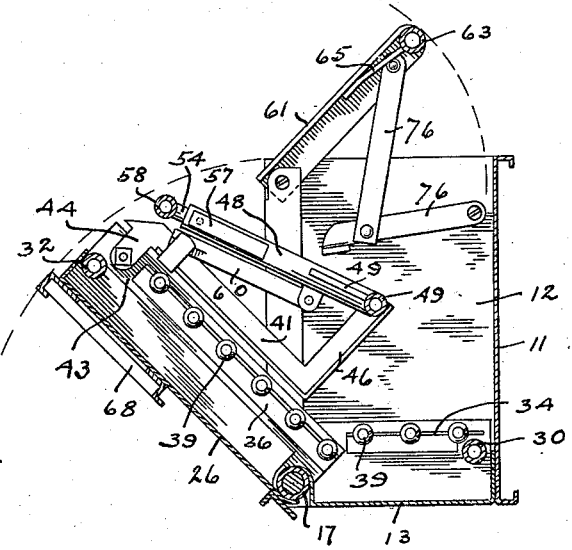
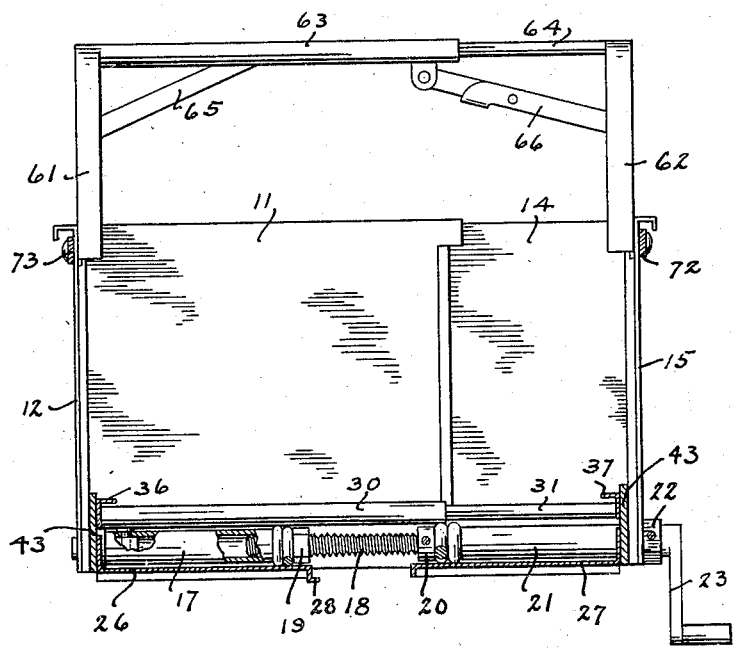
Fig. 8.
INVENTOR
John J Giffel,
BY Minturn & Minturn,
Attorneys Patented Mar. 24, 1931

1,797,229

UNITED STATES PATENT OFFICE

JOHN J. GIFFEL, OF TERRE HAUTE, INDIANA, ASSIGNOR OF ONE-THIRD TO LAWRENCE O. TRUTTIER, OF TERRE HAUTE, INDIANA

TRUNK BED

Application filed February 10, 1930. Serial No. 427,184.

This invention relates to the art of folding beds and particularly to a type of bed that may be carried about on an automobile to be readily available with a minimum amount of labor for use in camping trips and the like, or overnight stops along the road.

A primary object of the invention is to provide a bed unit that may be collapsed to come within the confines of a trunk adapted to be secured on the rear of an automobile having dimensions that are not out of proportion with the automobile.

Another primary object is to provide a collapsible structure which may be extended to provide a tent support over a bed, the entire structure being adapted to be concealed within a trunk when not in use.

Another primary object of the invention is to provide a collapsible bed and tent structure that may be readily operated with the minimum expenditure of energy both in the carrying of the various members to the usable position and in collapsing the parts to the closed concealed positions within an enclosed trunk.

Further objects reside in the unique formation of the trunk walls that permit the extension of the various members so as to provide a bed of ample width and length for two individuals.

An object of the invention also resides in the provision for carrying a spare tire on the rear wall of the trunk which is employed to enclose the various members.

These and other objects will become apparent in the following description of one particular form of the invention as illustrated in the accompanying drawings, in which—

Fig. 1, is a rear elevation of an automobile to which my invention is applied;

Fig. 2, is a fragmentary side elevation of the automobile with the bed structure completely collapsed and ready for travel;

Figure 3:
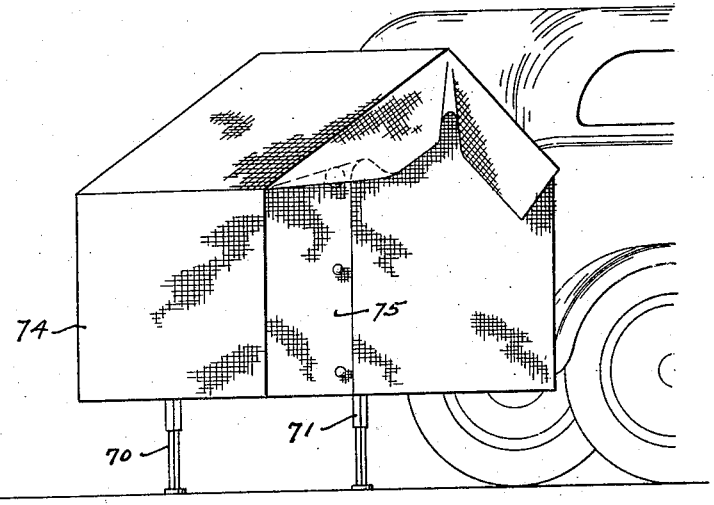
Figure 6:
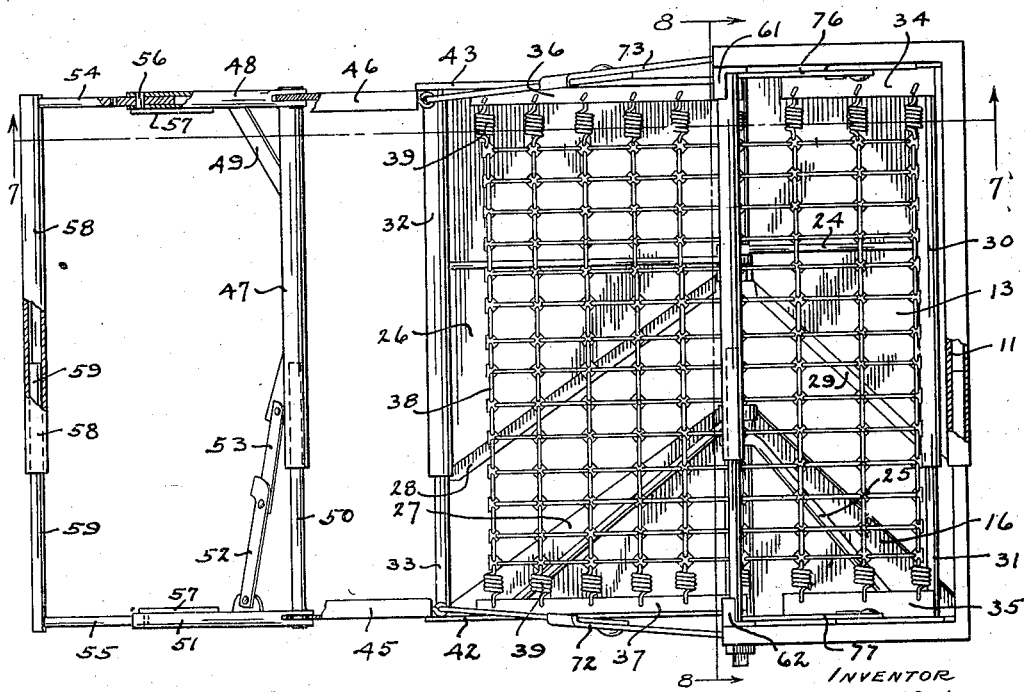

Fig. 3, a rear view in perspective showing the bed ready for use and enclosed by the tent housing;

Fig. 4, a fragmentary side elevation of the bed structure;

Fig. 5, a detail in side elevation;

Fig. 6, a top plan view of the bed structure in an extended usable position with the tent covering removed;

Fig. 7, a vertical longitudinal section on the line 7—7 in Fig. 6, showing the various members folded and approaching their closed positions; and Fig. 8, a transverse vertical section on the line 8—8 in Fig. 6.

Like characters of reference indicate like parts throughout the several views in the drawings.

I form a trunk generally designated by the numeral 10 with a rear wall 11, an end 12 fixed thereto, a base member 13 united by its side and end to the respective side 11 and end 12 and a side member 14 which is adapted to slide along the outer side of the side 11 as an extension thereof, the member 14 also carrying the end 15 opposing the other end 12 and a bottom section 16. The bottom sections 13 and 16 are cut to have opposing edges in parallel relation diagonally in respect to the side members 11 and 14.

The side of the base member 13 which is removed from the side wall 11 carries a tubular housing 17 into which freely passes a shaft 18 screw-threadedly through a nut 19 fixed on the end of the housing 17 toward the base section 16.

This shaft 18 has a collar 20 fixed thereon which rotatably abuts the end of the tubular housing 21 which is formed along the corresponding edge of the base section 16 and extends rotatably through this housing to project therefrom and carry thereon in fixed relationship the outer collar 22 and the crank 23. Since the shaft 18 has the collars 20 and 22 thereon with the housing 21 therebetween and screw-threadedly enters the nut 19 fixed on the housing 17, suitable rotation of the crank 23 will carry the bottom section 16 with its attached end 15 and back 14 either away from or toward the base section 13 and the back member 11 with the back section 14 telescopically sliding along the back 11 and a gap being formed between the two base sections 13 and 16 as the section 16 moves outwardly. Suitable braces 24 and 25 extend respectively across the base sections 13 and 16 to space and reenforce the housings 17 and 21 so as to retain them in a straight line axially of the shaft 18.

To form the front wall of the trunk 10, I hinge the section 26 by its lower end to the housing 17, and hinge the complementary section 27 to the housing 21. The opposing edges of the front wall sections 26 and 27 are cut on parallel diagonal lines, Fig. 6, so that when the base section 16 is in contact with the base section 13, the front wall section 27 is also drawn into contact along its diagonal edge with the wall section 26 so that the gap therebetween is completely eliminated. A lip 28 is preferably carried on the section 26 to lap over the edge of the section 27 as is also a lip 29 on the section 13 carried to lap over the edge of the section 16 so as to from a concealed joint to prevent the entrance of dust and water therethrough.

A tube 30 is fixed along the inside of and toward the bottom of the rear wall 11, Figs. 6, 7, 8, and a rod 31 is fixed by its outer end to the end wall 15 to have its other end telescoping within the tube 30, as a means of aiding in the support of the end section 15 and the attached base section 13 and wall section 14.

Along the extreme upper edge of the front wall section 26 is also fixed a tubular member 32 into which telescopes a rod 33 fixed by its outer end to the other wall section 27 as a means of retaining the sections 26 and 27 in the same plane as they may be swung about their axis at the rear edges of the base sections 13 and 16. Angle bars 34 and 35 are fixed respectively to the end walls 12 and 15. Angle bars 36 and 37 are carried respectively at the outer ends of the rear wall sections 26 and 27 spaced inwardly therefrom at a distance. Between the angle bars is positioned a flexible wire bed 38 which is attached to the angle bars by a plurality of springs 39.

A pair of posts 40 and 41 are pivotally secured to flanges 42 and 43 projecting upwardly respectively from the front wall sections 27 and 26. Each of these posts 40 and 41 have feet 44 projecting angularly from the posts to serve as the pivoting members and to carry the posts outwardly beyond and above the tube 32 and its telescoping rod 33 as a means of limiting the travel of the posts when swung outwardly from over the respective wall sections 27 and 26. The upper ends of both posts 40 and 41 have arms 45 and 46 extending from their top ends parallel to but in the reverse direction from the feet 44. A length of tubing 47 is pivoted by one end at the outer end of the arm 46 and has fixed thereto at right angles the tube 48 held in rigid engagement therewith by the brace 49 so as to preserve a ninety degree angle therebetween. A rod 50 is pivotally engaged by one end to the outer end of the arm 45 and telescopes within the tube 47 by its other end. A short length of tubing 51 corresponding to the tube 48 is rigidly secured by its upper end to the rod 50 and has a brace extending diagonally from it to the tube 47 composed of the two levers 52 and 53 pivoted one to the other so as to permit breaking of the brace when the rod 50 is carried within the tube 47.

The outer ends of the tube 48 and 51 receive slidingly therein the rods 54 and 55 each of which are perforated to be engaged selectively by pins 56 carried on the springs 57. The outer ends of the rods 54 and 55 are interconnected by the telescoping member consisting of the tube 58 and the rod 59 entering therein. Each of the tubes 48 and 51 carries an arm 60 pivotally attached thereto and having forked outer ends adapted to bear against the respective posts 40 and 41 as means for holding the tubes 48 and 51 at selective positions of swinging outwardly from the posts.

At the upper rear corners of the ends 12 and 15 are posts 61 and 62 pivotally attached thereto by their lower ends. The upper ends of these posts 61 and 62 are interconnected by the telescoping member consisting of the tube 63 fixed by its end to the post 61 and the rod 64 fixed by one end to the post 62 and slidingly entering the tube 63. The tube 63 is maintained in a rigid position of ninety degrees from the post 61 by means of the fixed brace 65. A brace 66 is provided diagonally across from near the end of the tube 63 to the post 62. This brace 66 may be broken to permit the rod 64 to be carried farther within the tube 63. The spare tire 67 is carried by a suitable carrier 68 on the front wall section 26.

Assuming the trunk 10 to be in a closed condition as indicated in Figs. 1 and 2, the lid 69 enclosing the top of the trunk is removed and the crank 23 is revolved to cause the shaft 18 to carry the base section 16 and all of the parts interconnected therewith outwardly away from the section 13. In the normally closed position the base section 16 and its connected parts are in the normal closed positions approximately within the space defined by the length of the rear wall section 11, length of the end wall 12, and the height of both members.

By turning the crank 23 to cause the base section 16 to be extended or carried away from the base section 13, the rear wall section 14 slides along the wall section 11, the rod 31 is extended further from the tube 30, and the rod 33 is also extended correspondingly from the tube 32. Similarly all of the other various rods, namely rods 58, 59, and 64 are extended further from their respective tubular receiving members. The crank 23 is revolved until the bed 38 reaches its proper tension and the braces 52 and 56 approach straight lines.

The sections 26 and 27, now spaced apart one from the other as in Fig. 6, are swung backwardly and downwardly as a unit to substantially a horizontal position, Fig. 4, and adjustable legs 70 and 71 pivoted thereto are swung down to vertical positions to have their feet contact the ground. The exact detail construction of these legs is not shown since there are various types of such adjustable legs now well known to those versed in the art, and the exact construction of which does not enter into my invention. The posts 40 and 41 are then swung around from their normally closed position over the bed 38 to approach vertical positions as limited by the feet 44 striking the tube 32 and rod 33. Preferably braces 72 and 73 hingedly supported on the respective ends 12 and 15 are provided with hooks at their rear free ends to engage in suitable eyes on the posts 40 and 41 as means for spacing and holding the posts in fixed positions from the ends 12 and 15. Both braces 72 and 73 are of the toggle type in two pieces to provide for the engagement with the posts and then forcing the posts outwardly by bringing the braces to straight line positions. A tent covering 74 is provided and formed properly to completely enclose the structure in the extended position as just described.

This covering 74 is formed to have a pocket along one edge to receive therein the tube 58 and its telescoping rod 59 which members may be extended in parallel relation from the tube 47 and its telescoping rod 50 by pulling the rods 54 and 55 outwardly from the tubes 48 and 51 and securing them by the pins 56 carried on the springs 57 as the tension on the covering may require.

The arms 45 and 46 at the upper ends of the posts 40 and 41 are provided as spacing members to carry the covering 74 outwardly and rearwardly from the posts so as to provide an aisleway therebetween to permit the entrance of persons in dressing and undressing. That part of the covering carried on the frame work pivoted on the outer end of the arms 45 and 46 may be swung outwardly as indicated by the dash lines in Fig. 4, to give additional space when privacy is not desired and that part of the covering then serves as an effective awning. The covering is supported in that position by the arms 60 bearing against the respective posts as indicated in Fig. 5. The covering 74 is provided with flaps 75 which may be brought around to enclose the ends of the space defined back of the posts 40 and 41 as indicated in Fig. 3. The tubular member 63 and its extensible rod 64 serves as the ridge pole for the tent when in the upright position as shown in Figs. 4 and 6. Each of the posts 61 and 62 are held in the vertical positions by the braces 76 and 77 which are also of the toggle type permitting them to be broken so that the posts 61 and 62 may be revolved back down to within the space between the ends 12 and 15.

The bed 38 when extended as above described forms a bed of ample size for two adults. The bed in this position is intended to be used by persons lying cross ways of the car instead of longitudinally therewith.

A mattress (not shown) may of course be used on top of the wire bed and bed clothes together with such mattress may all be folded up and carried within the trunk 10 together with the covering 74 in a compact readily accessible manner.

While I have here shown and described my invention in the one best form as now known to me, it is obvious that many structural changes may be made therefrom without departing from the spirit of the invention, and I, therefore, do not desire to be limited to that precise form, nor any more than may be required by the following claims.

I claim:

1. In a trunk, a relatively fixed trunk end comprising an end wall, sections of forward and rear walls and a base section; a movable trunk end comprising an end wall, sections of forward and rear walls, and a base section; means for moving said movable end away from the fixed end in parallel relationship thereto; each of said sections of front walls being hinged to their respective trunk ends; and a bed secured by its ends to said trunk ends whereby moving the trunk ends apart extends said bed.

2. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed.

3. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends.

4. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends, the ends of said bed being extended and attached to said front wall.

5. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends, the ends of said bed being extended and attached to said front wall, posts hinged to the upper part of the sections of said front wall adapted to swing from over the bed to positions normal to the wall, and an extensible member between the upper ends of said posts.

6. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends, the ends of said bed being extended and attached to said front wall, posts hinged to the upper part of the sections of said front wall adapted to swing from over the bed to positions normal to the wall, and an extensible member between the upper ends of said posts, arms extending angularly from the upper ends of the posts and carrying said extensible member at a distance laterally from the posts.

7. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends, the ends of said bed being extended and attached to said front wall, posts hinged to the upper part of the sections of said front wall adapted to swing from over the bed to positions normal to the wall, and an extensible member between the upper ends of said posts, arms extending angularly from the upper ends of the posts and carrying said extensible member at a distance laterally from the posts, and a frame extensible laterally and longitudinally fixed to said extensible member rotatable therearound.

8. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends, and a longitudinally extensible ridge pole hingedly supported from the respective trunk ends.

9. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends, the ends of said bed being extended and attached to said front wall, posts hinged to the upper part of the sections of said front wall adapted to swing from over the bed to positions normal to the wall, and an extensible member between the upper ends of said posts, and a longitudinally extensible ridge pole hingedly supported by the trunk ends.

10. In a trunk, a relatively fixed trunk end, a movable trunk end, members extensibly uniting said two ends, means for extending said movable end from the fixed end, and a bed secured by its ends to each of said trunk ends whereby moving apart of said trunk ends extends the bed, and a front trunk wall in two sections hinged at its lower edge to the trunk ends, the ends of said bed being extended and attached to said front wall, posts hinged to the upper part of the sections of said front wall adapted to swing from over the bed to positions normal to the wall, and an extensible member between the upper ends of said posts, arms extending angularly from the upper ends of the posts and carrying said extensible member at a distance laterally from the posts, and a frame extensible laterally and longitudinally fixed to said extensible member rotatable therearound, and a longitudinally extensible ridge pole hingedly supported by the trunk ends.

11. In a trunk, a relatively fixed trunk end comprising an end wall, sections of forward and rear walls and a base section; a movable trunk end comprising an end wall, sections of forward and rear walls, and a base section; means for moving said movable end away from the fixed end in parallel relationship thereto; each of said sections of front walls being hinged to their respective trunk ends; and a bed secured by its ends to said trunk ends whereby moving the trunk ends apart extends said bed, said bed having its ends also secured to said two front wall sections; and an extensible guide member joining the upper ends of said front wall sections.

12. In a trunk, a relatively fixed trunk end, a movable trunk end, members extensibly joining the two ends, a crank operated means for extending said movable end from the fixed end, and a bed secured by its ends to the respective trunk ends adapted to be extended for use upon moving apart of said two trunk ends.

13. In a trunk, a relatively fixed trunk end, a movable trunk end, members extensibly joining the two ends, and a bed secured by its ends to the respective trunk ends adapted to be extended for use upon moving apart of said two trunk ends, and a front trunk wall hinged at its bottom to the fixed end having part of the bed ends fixed thereto adapted to be swung outwardly and carry a part of said bed thereover.

14. In a trunk, a relatively fixed trunk end, a movable trunk end, members extensibly joining the two ends, said ends having a bed secured by its ends to the respective trunk ends adapted to be extended for use upon moving apart of said two trunk ends, and tent covering support members telescopically supported between said trunk members and telescoped by the movement of said trunk members.

15. In a trunk, a relatively fixed trunk end, a movable trunk end, members extensibly joining the two ends, and a bed secured by its ends to the respective trunk ends adapted to be extended for use upon moving apart of said two trunk ends, a screw shaft interposed between said two trunk ends, and means for revolving said shaft to move the movable end in relation to the fixed end.

In testimony whereof I affix my signature.

JOHN J. GIFFEL.